(12) United States Patent
Pedoussaut et al.

(10) Patent No.: US 12,104,724 B2
(45) Date of Patent: Oct. 1, 2024

(54) OPTIMIZED CONNECTION ASSEMBLY BETWEEN TWO PORTIONS OF A CRYOGENIC LINE, COMPRISING A DOUBLE SEALING BARRIER, A FLUID EXPANSION CHAMBER AND A DETECTOR FOR DETECTING THE PRESENCE OF THE FLUID IN SAID CHAMBER

(71) Applicants: Airbus SAS, Blagnac (FR); Airbus Operations SAS, Toulouse (FR); Airbus Operations LTD, Filton Bristol (GB)

(72) Inventors: Philippe Pedoussaut, Blagnac (FR); Hervé Tressol, Toulouse (FR); Najoua Erroui, Toulouse (FR); Mouayiad Shebli, Filton Bristol (GB)

(73) Assignees: Airbus SAS, Blagnac (FR); Airbus Operations SAS, Toulouse (FR); Airbus Operations LTD, Filton Bristol (GB)

( * ) Notice: Subject to any disclaimer, the term of this patent is extended or adjusted under 35 U.S.C. 154(b) by 0 days.

(21) Appl. No.: 17/973,622

(22) Filed: Oct. 26, 2022

(65) Prior Publication Data

US 2023/0135912 A1     May 4, 2023

(30) Foreign Application Priority Data

Oct. 28, 2021   (FR) ...................................... 2111496

(51) Int. Cl.
*F16L 23/18*     (2006.01)
*F16L 23/028*    (2006.01)
(Continued)

(52) U.S. Cl.
CPC .......... *F16L 23/24* (2013.01); *F16L 23/0283* (2013.01); *F16L 23/162* (2013.01); *F16L 23/167* (2013.01); *F16L 23/18* (2013.01)

(58) Field of Classification Search
CPC ......... F16L 23/167; F16L 23/18; F16L 23/24; F16L 23/0283; F16L 23/162; F16L 23/006

See application file for complete search history.

(56) References Cited

U.S. PATENT DOCUMENTS 5,090,871 A * 2/1992 Story ...................... G01M 3/38
                                                  417/63
2011/0012338 A1   1/2011 Kitaguchi
(Continued)

FOREIGN PATENT DOCUMENTS

DE   4130593 A1   3/1993
EP   2058573 A1   5/2009
(Continued)

OTHER PUBLICATIONS

French Search Report dated May 31, 2022; priority document.

*Primary Examiner* — Zachary T Dragicevich
*Assistant Examiner* — James A Linford
(74) *Attorney, Agent, or Firm* — Greer, Burns & Crain, Ltd.

(57) ABSTRACT

A connection assembly between two portions of a line including an inner conduit for transporting a cryogenic fluid, the assembly including two flanges which are respectively arranged at the ends of the line portions and which are configured to be held in contact with one another by virtue of a fixing arrangement. The contact zone between the two flanges includes at least two grooves for positioning seals and at least one conduit opening out, for the one part, between the two seals and, for the other part, into an expansion chamber for the cryogenic fluid. The expansion (Continued)

chamber is arranged in one, or in the vicinity of one, of the first connection flange and the second connection flange. The expansion chamber includes a detector for detecting the presence of the cryogenic fluid in the expansion chamber or a recess configured for the installation of such a detector.

9 Claims, 4 Drawing Sheets

(51) Int. Cl.
*F16L 23/16* (2006.01)
*F16L 23/24* (2006.01)

(56) References Cited

U.S. PATENT DOCUMENTS

| | | |
|---|---|---|
| 2011/0154886 A1 | 6/2011 | Carns et al. |
| 2011/0185793 A1* | 8/2011 | Harrison ............... F16L 23/167 |
| | | 277/320 |
| 2014/0174106 A1 | 6/2014 | Tang et al. |
| 2021/0071795 A1 | 3/2021 | Umemura et al. |
| 2022/0090709 A1 | 3/2022 | Eckols et al. |

FOREIGN PATENT DOCUMENTS

| | | |
|---|---|---|
| EP | 2256393 A1 | 12/2010 |
| EP | 3734133 A1 | 11/2020 |
| EP | 3971458 A1 | 3/2022 |
| FR | 1165716 A | 10/1958 |
| WO | WO-9801696 A1 * | 1/1998 ............ F16L 23/167 |

\* cited by examiner

OPTIMIZED CONNECTION ASSEMBLY BETWEEN TWO PORTIONS OF A CRYOGENIC LINE, COMPRISING A DOUBLE SEALING BARRIER, A FLUID EXPANSION CHAMBER AND A DETECTOR FOR DETECTING THE PRESENCE OF THE FLUID IN SAID CHAMBER

CROSS-REFERENCES TO RELATED APPLICATIONS

This application claims the benefit of the French patent application No. 2111496 filed on Oct. 28, 2021, the entire disclosures of which are incorporated herein by way of reference.

FIELD OF THE INVENTION

The present invention relates to a connection assembly between two portions of a line for transporting a cryogenic fluid. The invention notably relates to a connection assembly for a hydrogen line in aircraft systems.

BACKGROUND OF THE INVENTION

Liquid hydrogen is a cryogenic fluid which can be used as an energy source for producing electricity. Thus, for example, it is possible to use a hydrogen fuel cell to power all of the flight control and communications systems of an aircraft, and for the on-board lighting and for powering various accessories used in the aircraft. Liquid hydrogen may also act as an energy source for the propulsion of an aircraft, by being supplied to a fuel cell or else by direct combustion, which affords the advantage that only water is discharged into the atmosphere. The use of hydrogen requires distribution systems between one or more production and storage tanks and consuming devices. Thus, lines are conventionally used to convey the liquid hydrogen between a storage tank and a consuming device such as a hydrogen fuel cell. The lines used in most cases comprise an inner tube, in which the transported fluid circulates, and an outer wall, separated from the inner tube by one or more thermal insulation chambers which are placed under vacuum. Such lines, thermally insulated under vacuum, are pairs of concentric tubes in which the inner and outer tube walls are held at a distance from one another. In lines designed for the transport or distribution of a cryogenic fluid, the thermal insulation provided between the inner tube and the outer wall makes it possible both to maintain the fluid at a temperature suitable for distribution thereof (far below 0° C.) and to prevent ice formation around the outer wall, which would then be liable to generate mechanical stresses on adjoining elements of the distribution installation, owing to the progressive increase in the volume of ice accumulated around the line.

Cryogenic fluid distribution lines are frequently made up of a succession of flexible or rigid pipes which are thermally insulated under vacuum, and which are assembled with one another by means of appropriate connection elements. This is notably the case for lines used for the transfer of liquid oxygen, liquid nitrogen, liquid argon, liquid hydrogen, liquid helium, for example. The couplings (connections) between the various flexible or rigid pipes that make up the line are produced by virtue of connector pairs. Each connector pair comprises a male connector arranged at the end of a pipe and configured to be inserted in a female connector arranged at the end of the adjoining pipe, and to produce a clamped sliding mechanical connection. Sealing is obtained simply by using a material having a very low expansion (coefficient of expansion) for the male connector and a material having a much higher expansion for the female connector, such that, when a cryogenic fluid circulates in the line, the female connector contracts onto the male connector to produce the clamped mechanical connection from a sliding connection. The sealing is reinforced by the use of an O-ring seal placed between the connected ends of two adjoining pipes. An O-ring seal may be disposed, for example, between two flanges which are adjacent or, respectively, set back from the male fitting and at the end of the female fitting, or between the end of the male fitting and the bottom of the female fitting. However, this type of joint between two adjoining pipes of the same line requires that the male connector (or male fitting) be inserted in the female connector (or female fitting) over a significant length in relation to the diameter of the line (up to several tens of centimeters). For such a joint to be sealed, the male and female connectors have to be rigid, in addition to being coupled over a significant length. Such a configuration is not practical if a line, and more broadly a fluid distribution system, has to be installed in a confined space, as is frequently the case on board an aircraft. Moreover, a significant insertion length of the male fitting in the female fitting requires a considerable space around the line in order to be able to separate two adjoining pipes during a removal operation.

The situation has room for improvement.

SUMMARY OF THE INVENTION

It is an object of the present invention to propose connection means between two line portions for transporting a cryogenic fluid, the connection means not having at least some of the drawbacks of the existing solutions.

To that end, there is proposed a flange-connection assembly between two portions of a line for transporting a cryogenic fluid in an inner conduit of the line, the connection assembly comprising a first line portion and a second line portion, the first line portion comprising a first connection flange arranged at one of its ends and configured to be held in contact with a second connection flange, arranged at one of the ends of the second line portion, at least one of the first flange and second flange comprising a first groove for positioning a first seal, the first groove being arranged around the inner tube, and at least one of the first flange and second flange comprising a second groove for positioning a second seal, the second groove being arranged around the first groove for positioning the first seal and having a diameter greater than the diameter of the first groove, the first groove and second groove being configured such that the first seal and second seal which are positioned therein produce a sealed connection between the two flanges by isolating the inner conduit from the exterior of the line, the connection assembly further comprising at least one conduit opening out, for the one part, between the first groove and the second groove, and opening out, for the other part, into an expansion chamber for the cryogenic fluid, the expansion chamber being arranged in one, or in the vicinity of one, of the first connection flange and the second connection flange, the expansion chamber comprising a detector for detecting the presence of the cryogenic fluid in the cryogenic fluid expansion chamber or a recess configured for the installation of such a detector.

Advantageously, it is thus possible to produce a less bulky connection of two cryogenic fluid line portions while having the capacity to detect a leak before diffusion of the fluid outside the line.

The connection assembly according to the invention may also have the following features, considered alone or in combination:
- the first and second groups are configured to house O-ring seals.
- several conduits open out, for the one part, between the first groove and the second groove, and open out, for the other part, into the cryogenic fluid expansion chamber.
- an end of a conduit opening out between the first and second grooves opens out at the bottom of a slot arranged in one of the first flange and second flange, between the first groove and second groove.
- at least one of the first flange and second flange comprises a third groove for positioning a third seal, the third groove having a diameter smaller than the diameter of the first groove and being arranged between the inner conduit and the first groove.
- the expansion chamber comprises an absorbent element.

Another subject of the invention is a distribution system for distributing liquid hydrogen, comprising a connection assembly as described above.

Another subject of the invention is an aircraft comprising a connection assembly between two line portions as mentioned above or a liquid hydrogen distribution system comprising such an assembly.

BRIEF DESCRIPTION OF THE DRAWINGS

The above-mentioned features of the invention, together with others, will become more clearly apparent upon reading the following description of one exemplary embodiment, the description being given with reference to the appended figures, in which.

DETAILED DESCRIPTION OF THE PREFERRED EMBODIMENTS

Figure 1:
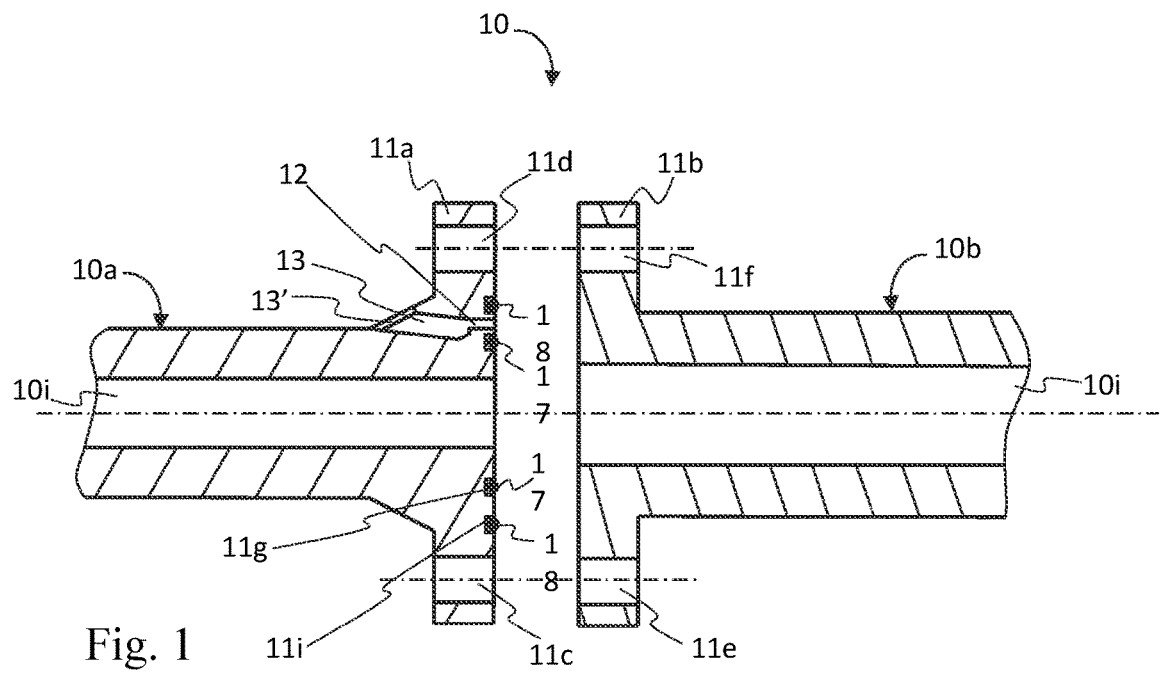
FIG. 1 is a section showing overall a connection assembly between two portions to be joined of the same line, according to one embodiment, before connection (before the connection assembly has been assembled)

FIG. 1 schematically shows a connection assembly 10 between a first portion 10$a$ of a line and a second portion 10$b$ of that same line, according to one embodiment.

According to this embodiment, the line shown is configured to transport a cryogenic fluid and comprises other line portions than portions 10$a$ and 10$b$. According to the example described, the line shown is configured to transport liquid hydrogen and more precisely to distribute liquid hydrogen on board an aircraft.

The portions of the line other than portions 10$a$ and 10$b$ are not shown here in so far as the invention relates to a connection assembly between two adjoining portions of the same line, which have been connected or are to be connected to one another, and only one of the connections between two adjoining portions of the line has to be described for a good understanding of the invention.

The term "connection" should be interpreted here as a synonym for a joint or coupling of two portions 10$a$ and 10$b$ of the liquid hydrogen distribution line. A sealed connection is understood to mean a connection produced in such a way as to prevent the fluid present in a conduit inside the line from leaking freely to outside the line, other than into a conduit or a fluid expansion chamber of the line. Here, the term "expansion chamber" denotes a volume of the line, inside the line or connected to an inner conduit of the line, which volume is enclosed (not open to the environment outside the line) during normal usage of the line, which allows the fluid transported in the line to diffuse therein under certain conditions, such as a sealing problem of a joint of the line that is normally sealed.

Each of the line portions 10$a$ and 10$b$ comprises an inner conduit 10$i$ or more exactly a portion of an inner conduit 10$i$ such that when the line portions are connected to one another, that is to say, joined in a sealed manner, a sealed inner conduit 10$i$ is created, by the continuity of the conduit portions 10$i$ of each of the assembled line portions 10$a$ and 10$b$.

Each of the line portions 10$a$ and 10$b$ comprises a connection flange intended to be held fixed in contact with and facing the connection flange of the other line portion. Thus, the line portion 10$a$ comprises a flange 11$a$ and the line portion 10$b$ comprises a flange 11$b$ intended to be held fixed to the connection flange 11$a$ of line portion 10$a$. The line flanges 11$a$ and 11$b$ are configured to be held in contact with, and facing, one another, such that after the connection assembly 10 has been assembled, the flanges fix and hold the line portion 10$a$ with the line portion 10$b$ while ensuring the continuity of the internal conduit 10$i$ of the line, by bringing two portions of the conduit 10$i$, which are respectively arranged in the line portion 10$a$ and in the line portion 10$b$, to face one another. Here, the term "connection flange" denotes a termination or terminal part of a line portion that follows a shoulder close to an end of the line portion, in the extension of the outer walls of the line, and that is arranged so as to receive means for fixing to a flange of similar shape, with a view to keeping the two similar flanges fixed to one another so as to extend the line by fixation of an additional line portion. The longitudinal body of a line portion may be flexible or rigid, and a connection flange may be assembled with the outer or inner walls by welding, screwing or molding, for example. According to one embodiment of the invention, the flanges 11$a$ and 11$b$ of line portions 10$a$ and 10$b$ each comprise machined portions or passage holes configured to receive bolts with a view to connecting the flanges to one another by means of these bolts (screw and nut assemblies). According to the example described, the connection flange 11a comprises several machined portions 11c and 11d, and the connection flange 11b comprises several machined portions 11e and 11f. Only machined portions 11c, 11d, 11e and 11f that are present in the plane of section are shown in FIG. 1. In FIG. 1, the plane of section is a vertical plane of section notably comprising a longitudinal axis of the liquid hydrogen transport line.

According to one embodiment, the connection flange 11a of the connection assembly 10 comprises a first groove 11g which is circular and concentric with a section of the inner tube 10i of the line portion 10a and which is configured to receive an O-ring seal 17.

The groove 11g for positioning the O-ring seal 17 is arranged parallel to the surface plane of the connection flange 11a, the surface plane being configured to bear against the similar surface plane of the flange 11b, such that the O-ring seal 17 forms a barrier between the inner tube 10i of the line and the environment outside the O-ring seal.

Cleverly, the connection between the connection flanges 11a and 11b comprises at least two O-ring seals and a fluid expansion chamber 13 opening out between these two O-ring seals. Thus, a second groove 11i for positioning an O-ring seal, the second groove also being circular and being concentric with the first groove 11g and a section of the inner tube 10i, is arranged in the connection flange 11a of the connection assembly 10. This second groove 11i for positioning an O-ring seal has a diameter greater than the diameter of the first groove 11g and is configured to position a second seal 18. Thus, the two O-ring seals 17 and 18 jointly afford a double barrier sealed with respect to a fluid present in the inner tube 10i of the line, at the connection between the line portions 10a and 10b, in order to prevent this fluid from being able to escape to the environment outside the line. Again cleverly, an expansion chamber 13, provided so as to receive an effusion of fluid in the event of a fault in the first O-ring seal 17, is arranged in the flange 11a. This fluid expansion chamber 13 is connected to the residual space available between the O-ring seals 17 and 18 via a conduit 12. Here, the term "volume of residual space" denotes a volume of space available between the connecting surfaces (or contact surfaces) of the connection flanges 11a and 11b, which is delimited by the O-ring seals 17 and 18 when the connection flanges 11a and 11b are assembled (held fixed and in contact with one another). The fluid expansion chamber 13 comprises an opening 13' to the outside, adapted for the positioning and holding of a sensing device for sensing the presence of liquid hydrogen. The opening 13' takes the form of a neck configured to receive an O-ring seal. Thus, if the first O-ring seal 17 constituting a sealed barrier, acting as a barrier to the fluid present in the inner tube 10i, breaks or deforms, completely or partially, or disintegrates, for example under the effect of repeated thermal stresses or under the effect of ageing, the liquid hydrogen present in the inner conduit 10i of the line occupies all or part of the volume of residual space available between the O-ring seals 17 and 18 and diffuses as far as the expansion chamber 13 through the conduit 12. Since the expansion chamber 13 is configured to comprise or receive a sensing device for sensing the presence of hydrogen in the expansion chamber 13, it is advantageously possible to detect a leak before the fluid is able to diffuse to outside the line. By virtue of the connection assembly 10, it is possible to provide a connection that is less bulky, or that is at the very least far less bulky than a bayonet-type connection such as those of the prior art, while still securing the connection against the risk of leakage.

Of course, other implementations of the double sealed barrier made up of two concentric O-ring seals are possible, and the example of implementation described above is not limiting. According to one variant, the grooves 11g and 11i are arranged in the connecting surface of flange 11b, and not of flange 11a, and the expansion chamber is arranged in connection flange 11a. According to another variant, one of grooves 11g and 11i is arranged in connection flange 11a, and the other one of grooves 11g and 11i is arranged in connection flange 11b. According to another variant, the fluid expansion chamber is arranged in connection flange 11b. According to another variant, a plurality of conduits similar to the conduit 12 are arranged between, for the one part, the residual space available between the O-ring seals 17 and 18, and therefore between the concentric grooves 11g and 11i, and, for the other part, the fluid expansion chamber 13, so as to optimize the propensity of the fluid to propagate in the expansion chamber 13 and therefore the capacity to rapidly detect a fault in the first O-ring seal 17, by a rapid detection of the presence of the fluid in the fluid expansion chamber 13.

According to one variant of the embodiment, the grooves 11g and 11i for positioning O-ring seals 17 and 18 are not concentric. Specifically, it is sufficient for the first groove 11g to surround the terminal section of the inner conduit 10i so as to be able to form a first barrier that is normally sealed in the connecting plane of the connection between the connection flanges 11a and 11b when the first groove contains the first O-ring seal 17. Similarly, it is sufficient for the second groove 11i for positioning the O-ring seal 18 to surround the first groove 11g so as to be able to form a second barrier that is normally sealed in the connecting plane of the connection between the connection flanges 11a and 11b when the second groove contains the second O-ring seal 18. The principle of rapid detection of an effusion of fluid between the first barrier and the second barrier thus formed is effective as long as one or more connecting conduits open out, for the one part, between the volume of residual space between the O-ring seals 17 and 18, and, for the other part, into the fluid expansion chamber 13. Of course, it is possible to use seals other than O-ring seals, such as flat annular seals. Those skilled in the art will know how to choose a type of seal suitable for the creation of a sealed connection between the connection flanges 11a and 11b by considering notably the shape of the grooves 11g and 11i and the various stresses that are liable to be applied to the connection assembly, for example temperatures far below 0° C., or even lower than −250° C., which are suitable for the transport or presence of a cryogenic fluid. Thus, according to other variants, the various elements described are configured to transport a cryogenic fluid other than liquid hydrogen, such as, by way of non-limiting examples, nitrogen, liquid argon, helium, etc.

According to one embodiment, the fluid expansion chamber 13 comprises an absorbent, preferably spongy, element in order to optimize the distribution of fluid in the chamber and to provide a buffer function.

Figure 2:
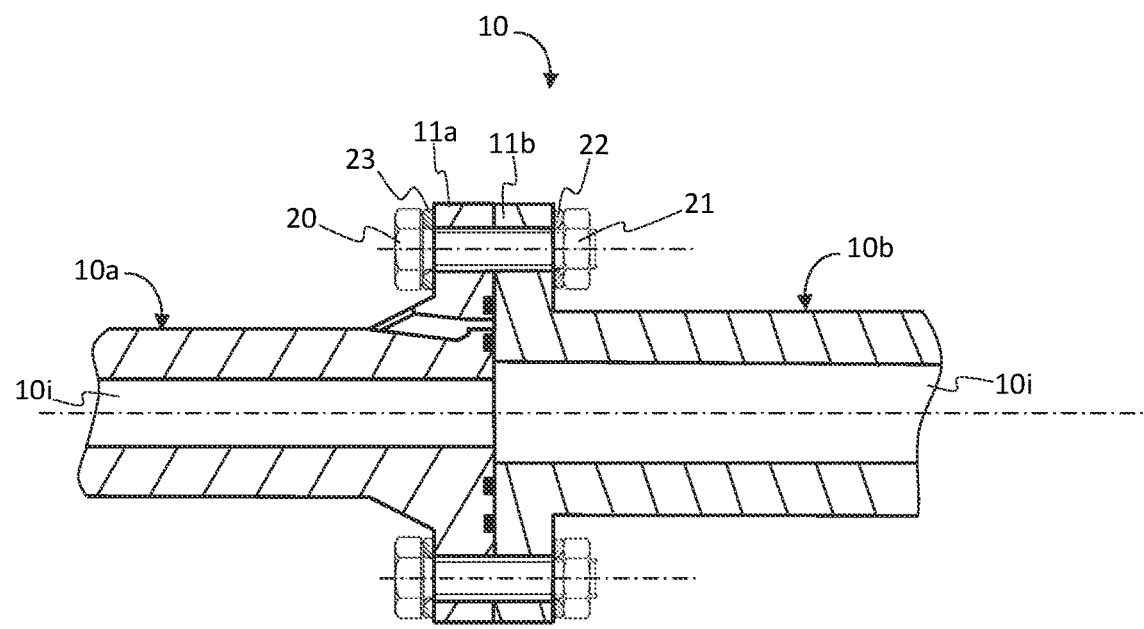
FIG. 2 is a section showing the connection assembly between two joined portions of a line, the connection assembly having already been shown in FIG. 1, after two line portions have been connected.

FIG. 2 shows the connection flanges 11a and 11b of the connection assembly 10 used for connecting line portions 10a and 10b, after assembly by means of bolts in the various through-holes 11c, 11d, 11e and 11f that are arranged in the connection flanges, according to one embodiment. The bolts are each made up of a screw 20 and a nut 21 respectively clamping flanges 11a and 11b against one another via washers 23 and 22. According to another embodiment, connection flanges 11a and 11b are held against one another by virtue of a collar of the V-clamp type which surrounds the flanges 11a and 11b simultaneously and which is itself held by clamping on the flanges. Such collars are well known to those skilled in the art. According to one embodiment, four bolts hold the connection flanges 11a and 11b in a position bearing against one another. According to one variant, eight bolts hold the two assembled flanges against one another. These examples are of course not limiting, and it is possible to use more bolts as a function of the diameter of the line and of the connection flanges 11a and 11b.

Figure 3:
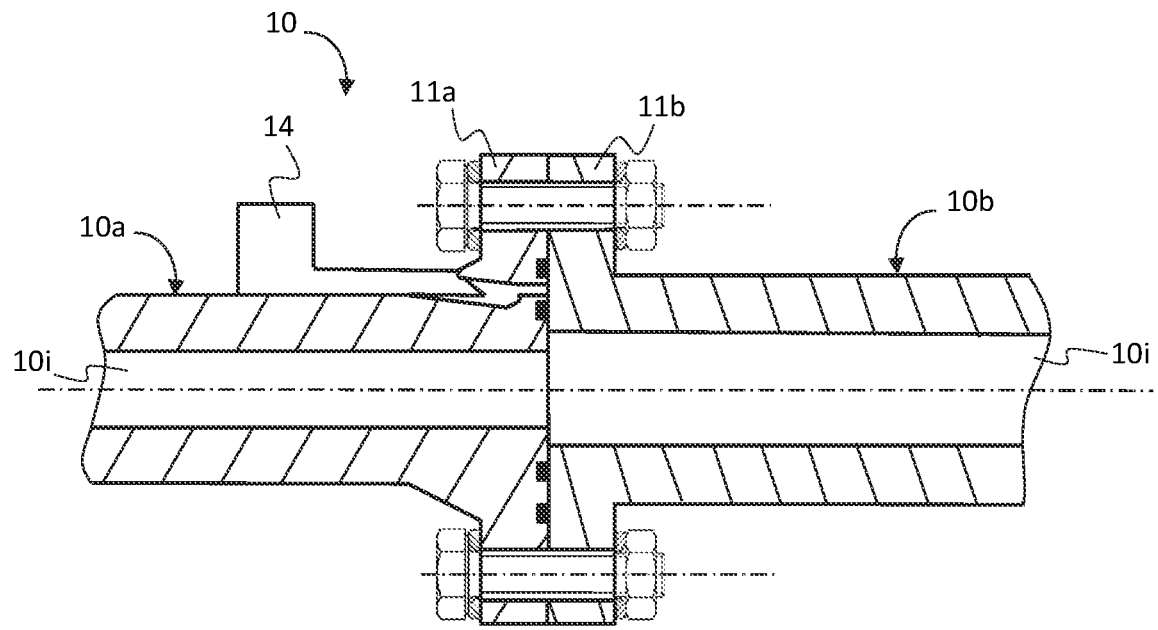
FIG. 3 is a section showing the assembled connection assembly, already shown in FIG. 2, equipped with a sensor for detecting the presence of a cryogenic fluid, the sensor being configured to detect the presence of fluid in an expansion chamber of the connection assembly.

FIG. 3 illustrates the positioning of a sensing device 14 for sensing the presence of fluid in the expansion chamber 13, the sensing device being arranged on the connection assembly 10. According to one embodiment, the sensing device 14 for sensing the presence of fluid in the expansion chamber 13 is held screwed to the connection flange 11a, and the connection between the body of the sensing device 14 and the opening 13' is sealed by the presence of an O-ring seal or sealed adhesive.

According to one embodiment of the invention, the sensing device 14 is supplied with electrical energy by means of a pair of cables (not shown in FIG. 3) and communicates with a remote device by wireless link, the remote device acting as a centralizer for information representative in each case of the presence of a fluid in an expansion chamber of the line. According to one variant, the sensing device 14 communicates with a remote device by signal modulation superposed with the electrical potential of its electrical power supply lines. According to another variant, an additional conductor is dedicated to the transmission, between the sensing device 14 and a remote control device, of a signal representative of the presence of fluid in the expansion chamber 13. The remote control device is configured to receive such a signal and to remotely control, where appropriate, the closure of a valve disposed upstream of the line portion comprising the expansion chamber 13. According to one embodiment of the invention, a valve for controlling the flow of fluid is integrated directly into one of the line portions 10a and 10b, depending on the direction of the fluid, making it possible to interrupt the supply of fluid in the inner conduit 10i of the line. According to one embodiment, each of the line portions comprises an isolation valve configured to interrupt the supply of fluid to this line portion or from this line portion. According to another variant of the embodiment, use is not made of a remote centralizer device, and each line portion comprises an isolation valve able to interrupt the transfer of fluid in that portion of the inner conduit 10i to which it belongs, on the basis of information delivered by a sensing device for sensing the presence of fluid, the sensing device functioning as described above and being present in the same line portion as the isolation valve.

Figure 4:
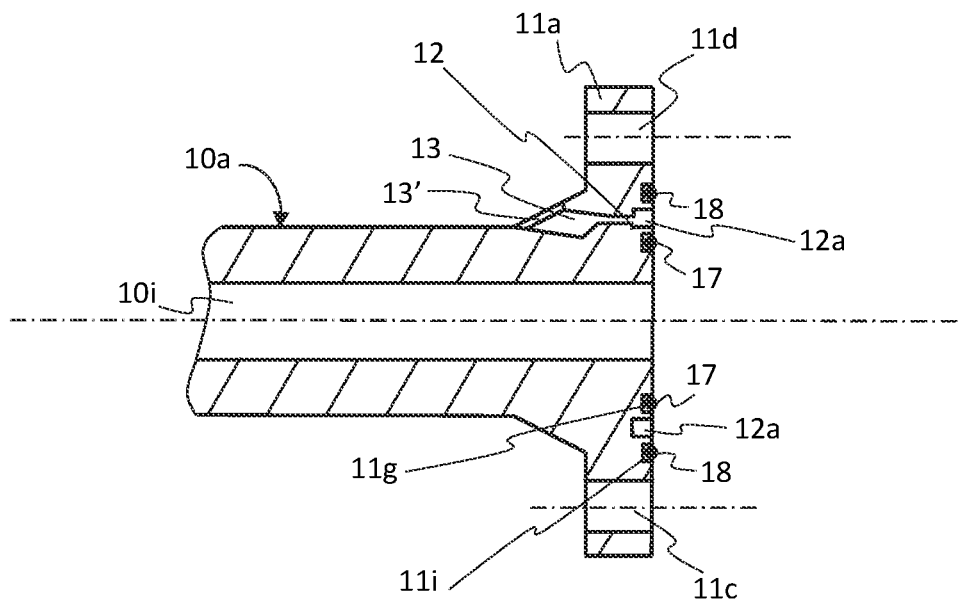
FIG. 4 is a section which shows a modified portion of the connection assembly already shown in FIG. 1 to FIG. 3, according to a first embodiment variant.

FIG. 4 illustrates an implementation variant of the connection flange 11a comprising the grooves 11g and 11i for positioning O-ring seals 17 and 18 of the connection assembly 10. According to this variant, the connecting conduit or conduits between, for the one part, the residual space available between the seals 17 and 18, and, for the other part, the expansion chamber 13, open out at the bottom of an annular slot 12a machined in the connecting surface of flange 11a (contact surface with flange 11b, after the connection has been assembled). Thus, the available residual space comprises, at a minimum, the volume of the circular slot 12a machined in the flange, this making it possible, in the presence of a leak at the seal 17, to facilitate an effusion of the fluid to the fluid expansion chamber 13, so as to accelerate the diffusion of the fluid to the expansion chamber and therefore the detection of the leak and the implementation of any subsequent operations (closure of an isolation valve or several isolation valves, for example). This is especially true when the connection flange 11a comprises an increased number of conduits similar to the conduit 12.

Figure 5:
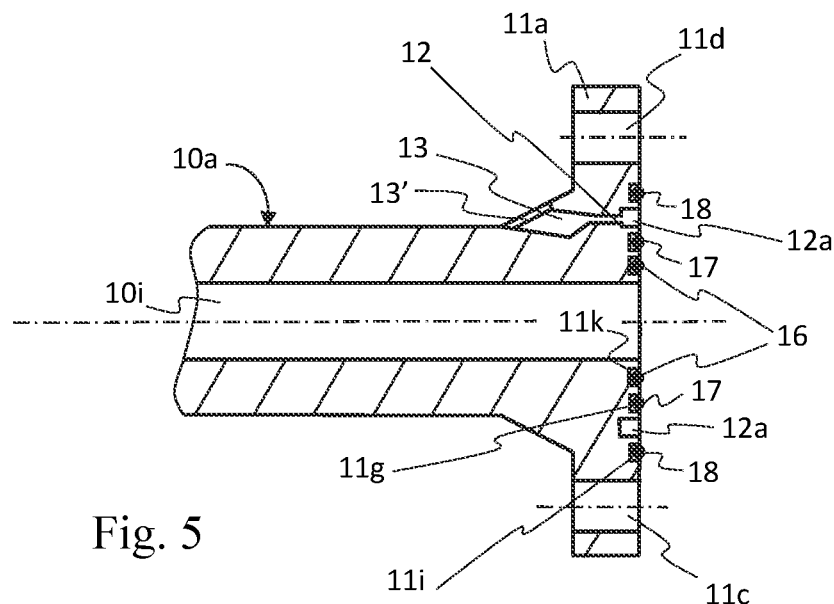
FIG. 5 is a section which shows a modified portion of the connection assembly already shown in FIG. 1 to FIG. 3, according to a second embodiment variant.

FIG. 5 illustrates a variant of the connection flange 11a in which the first sealing barrier disposed between the inner conduit 10i of the line and one or more connecting conduits to the expansion chamber is doubled by the arrangement of a third groove 11k for positioning a third O-ring seal 16 of the connection between the connection flanges 11a and 11b, and therefore between the line portions 10a and 10b. Advantageously, this makes it possible for the sealed connection to be kept operational for a longer period of time before detection of a leak, since two sealing faults respectively associated with O-ring seals 16 and 17 then have to be present in order for detection of a leak as far as the fluid expansion chamber 13 to be possible.

According to one variant, the third groove 11k and the third seal 16 positioned in the third groove 11k are arranged at the periphery of the second seal 18 so as to more effectively limit a risk of leakage to the environment outside the line in the event of a leakage of fluid to the expansion chamber 13, in the presence of a sealing fault associated with the first seal 17. Advantageously, this makes it possible to have better chances of preserving the environment outside the line in the event of a leak at the first sealing barrier, for example time to perform actions subsequent to the detection of such a leak, such as the closure of a valve, or any action aimed at safeguarding systems around the line.

Figure 6:
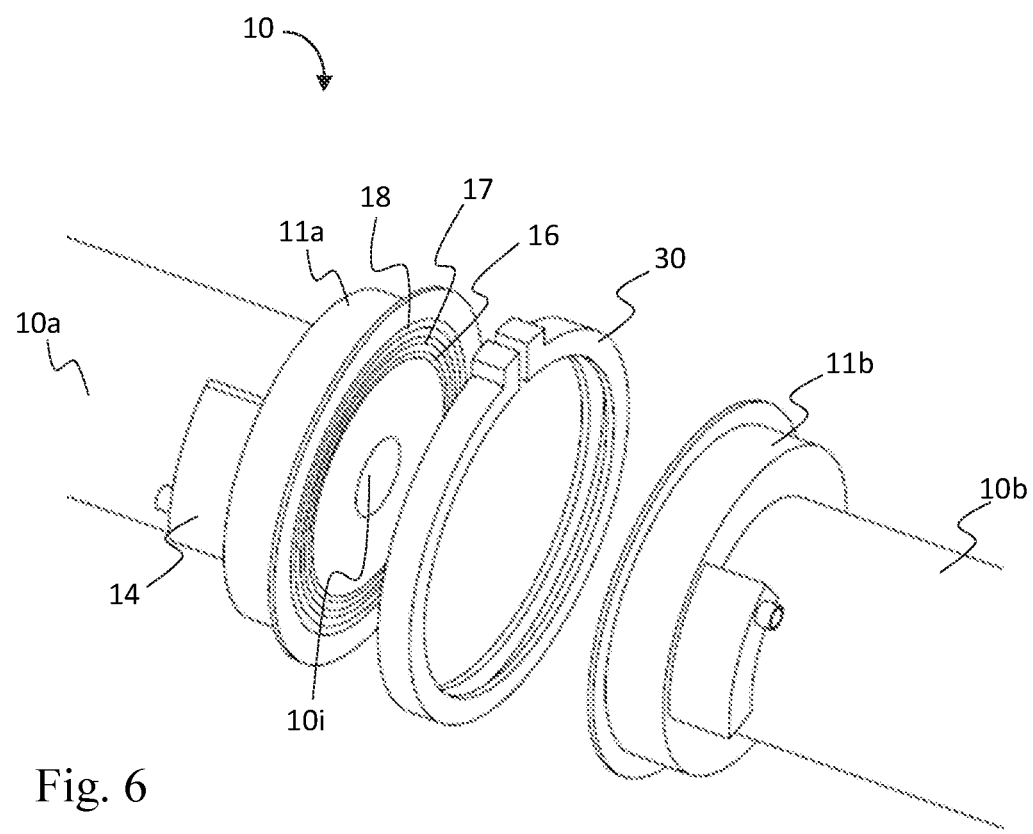
FIG. 6 is a perspective view showing a third variant of the connection assembly between the line portions, according to one embodiment.

FIG. 6 illustrates, in perspective view, an implementation variant of the connection assembly 10 according to which the flanges 11a and 11b are not assembled and held against one another by means of bolts, but by virtue of a coupling collar 30 of the V-clamp type configured to encircle, after mounting of the collar, the connection flanges 11a and 11b which are respectively arranged at the terminal part of the line portions 10a and 10b. According to the variant shown, three O-ring seals 16, 17 and 18 form a sealing barrier between the inner conduit 10i of the line and the environment outside the line. A sensing device 14 for sensing the presence of fluid in the expansion chamber 13 is fixed to the outer wall of the line portion 10a, and is ideally positioned as close as possible to the flange 11a comprising the fluid expansion chamber 13 that receives the fluid in the event of a leak at the first sealing barrier.

Figure 7:
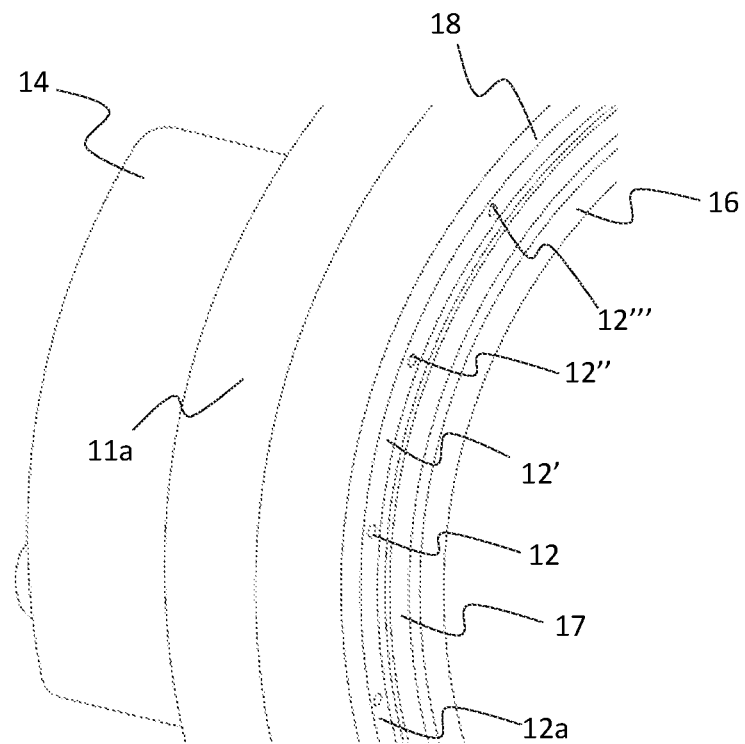
FIG. 7 is a partial perspective view illustrating implementation details of the connection assembly already shown in FIG. 6.

FIG. 7 illustrates details of the connection assembly 10 according to the embodiment already shown in FIG. 6. Here, it is notably possible to see connecting conduit portions 12, 12', 12" and 12''' which all open out into the groove 12a machined in the contact surface between the flange 11a and the flange 11b when the connection assembly is assembled.

According to this configuration, two O-ring isolation seals 16 and 17 are configured to form a first sealing barrier between the inner conduit 10i of the line and the slot 12a that opens towards the connecting ducts 12, 12', 12" and 12''' for connecting to the fluid expansion chamber 13, and an O-ring seal 18 is configured to form a second sealing barrier between, for the one part, the residual space between the seals 17 and 18 comprising the slot 12a, and, for the other part, the environment outside the line.

Figure 8:
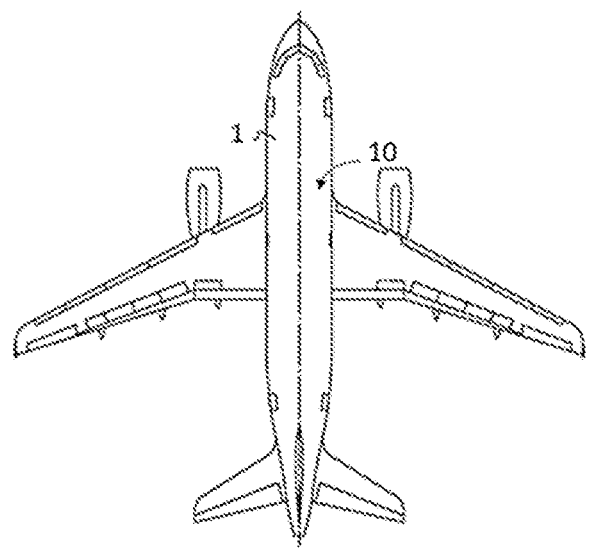
FIG. 8 illustrates a top view of an aircraft comprising a connection assembly between two portions of a line, as has already been illustrated in FIG. 1 to FIG. 7.

FIG. 8 shows an aircraft 1 comprising a hydrogen fuel cell and a liquid hydrogen distribution system comprising the connection assembly 10 and other connection assemblies similar to the connection assembly 10. Advantageously, the use of such connection assemblies, similar to the connection assembly 10, allows a liquid hydrogen distribution system to be installed between a hydrogen storage tank and the fuel cell of the aircraft 1. This is particularly advantageous on board an aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flange-connection assembly between two portions of a line for transporting a cryogenic fluid in an inner conduit of the line, the flange-connection assembly comprising:
a first line portion, and
a second line portion,
the first line portion comprising a first connection flange arranged at one of its ends and configured to be held in contact with a second connection flange, arranged at one of the ends of the second line portion,
at least one of said first connection flange and second connection flange comprising a first groove for positioning a first seal,
said first groove being arranged around said inner conduit, and
at least one of said first connection flange and second connection flange comprising a second groove for positioning a second seal,
said second groove being arranged around said first groove for positioning the first seal and having a diameter greater than the diameter of the first groove,
the first groove and second groove being configured such that the first seal and second seal, which are positioned therein, produce a sealed connection between the first and second connection flanges by isolating said inner conduit from the exterior of the line,
at least one conduit opening out, at a first end, between the first groove and the second groove, and opening out, at a second end, into an expansion chamber for said cryogenic fluid,
said expansion chamber located in one of the first connection flange and the second connection flange,
the expansion chamber comprising an absorbent element and a detector for detecting a presence of said cryogenic fluid.

2. The flange-connection assembly according to claim 1, wherein the first and second grooves are configured to house O-ring seals.

3. The flange-connection assembly according to claim 1, wherein several conduits each open out, at a first end, between the first groove and the second groove, and open out, at a second end, into said cryogenic fluid expansion chamber.

4. The flange-connection assembly according to claim 1, wherein the first end of the conduit opening out between the first and second grooves opens out at the bottom of a slot arranged in one of the first flange and second flange, between the first groove and second groove.

5. The flange-connection assembly according to claim 1, wherein at least one of the first flange and second flange comprises a third groove for positioning a third seal, said third groove having a diameter smaller than the diameter of said first groove and being arranged between said inner conduit and said first groove.

6. A distribution system for distributing a cryogenic fluid, comprising at least one flange-connection assembly according to claim 1.

7. An aircraft comprising the distribution system for distributing a cryogenic fluid according to claim 6.

8. An aircraft comprising the flange-connection assembly according to claim 1.

9. The flange-connection assembly according to claim 1, wherein the absorbent element located in the expansion chamber is spongy.

* * * * *